Dec. 1, 1959   L. D. EWER   2,914,961
DUAL ACCELERATORS
Filed Dec. 17, 1956
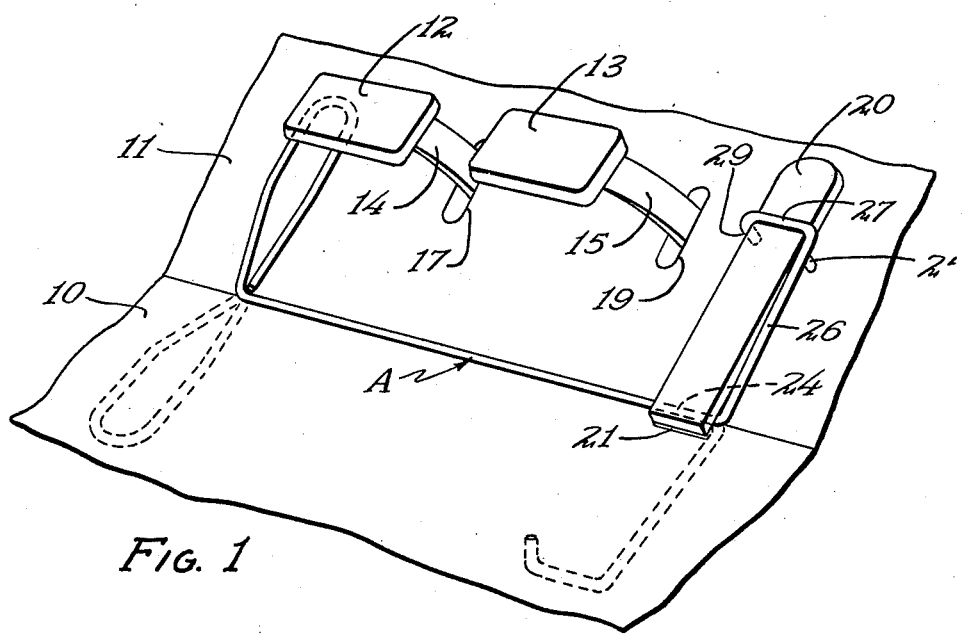
Fig. 1
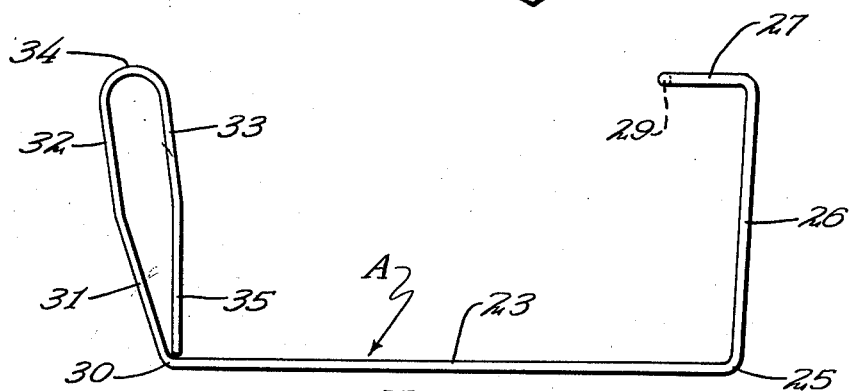
Fig. 2
Fig. 3
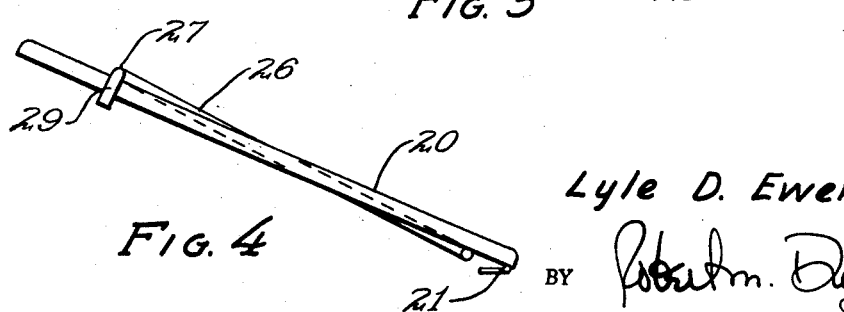
Fig. 4
INVENTOR
Lyle D. Ewer
BY Robert M. Dunning
ATTORNEY

United States Patent Office 2,914,961
Patented Dec. 1, 1959

2,914,961

DUAL ACCELERATORS

Lyle D. Ewer, St. Paul, Minn.

Application December 17, 1956, Serial No. 628,827

5 Claims. (Cl. 74—562.5)

This invention relates to an improvement in dual accelerators and deals particularly with an attachment for an automobile accelerator by means of which the accelerator may be operated by the left foot.

In the production of automobiles it is common practice to locate the vehicle accelerator in a position where it may be operated by the right foot. In cars not having an automatic transmission, the left foot is usually used to operate the clutch pedal while the right foot also operates the brake pedal. Oftentimes, the brake pedal is located directly in front of the driver while the accelerator is slightly to the right of the center position. In driving over extended periods of time, and particularly on open highways, all of the work to be done is accomplished by the right foot. This is even more true with cars having an automatic transmission where there is no clutch pedal to operate.

An object of the present invention resides in the provision of a simple attachment which may be formed of a single rod of material bent to a predetermined shape and which may be quickly and easily attached to the accelerator pedal. In view of the fact that no fastening means are required to attach the dual accelerator in place, the device is extremely simple to apply and to remove. Furthermore, in view of the fact that no fastening means are provided, it is not necessary for the driver to attach or detach clamps or other such means in order to apply and remove the apparatus.

A feature of the present invention resides in the provision of a dual accelerator which includes a transverse center portion designed to lie flat on the floor of the vehicle with one end thereof extending beneath the hinged end of the accelerator pedal. A substantially right angularly extending portion is arranged to extend alongside of the pedal to a point near the free end thereof. At this point an arm is provided which extends across the upper surface of the accelerator to rest against this pedal. A loop is provided at the opposite end of the transverse rod which is in substantially a common plane with the right angularly extending portion described. This loop forms an auxiliary pedal which may be operated by the left foot of the driver.

A feature of the present invention resides in the fact that the auxiliary accelerator pedal is held in the proper angle relative to the floor boards of the car by having a portion of the transverse rod extend beneath the hinged end of the accelerator and by providing a transverse portion overlying a part of the pedal at a point spaced from the hinged end thereof. When pressure is applied to the auxiliary pedal, the transverse rod is held in place by its engagement between the floor and the hinged end of the accelerator and a downward force is exerted against the accelerator pedal at a point spaced from the hinged end to operate this pedal in a normal manner.

A feature of the present invention lies in the fact that the portion of the structure which overlies the accelerator pedal may be provided with a downturned hook end to prevent lateral movement of the dual accelerator. This hook end normally holds the dual accelerator from lateral movement in one direction, and the engagement of the right angularly extending portion of the structure with the opposite side of the accelerator pedal prevents lateral movement of the dual accelerator in the opposite direction. By pivoting the auxiliary pedal upwardly a short distance, the hook end may be disengaged from the accelerator pedal so that the apparatus may be easily detached.

A further feature of the present invention lies in the provision of a device of the type described which pivots about a transverse center portion of the structure and which may be pivoted out of contact with the accelerator pedal to lie flat upon the floor of the vehicle. As a result, when the structure is not in use, it is out of the way and will not interfere with the operation of any of the pedals.

A further feature of the present invention lies in the fact that the loop which forms the auxiliary or dual accelerator is tapered so that the end of the loop adjoining the transverse center portion extends from substantially a single point. As a result, the loop may be bent toward or away from the opposite end of the apparatus at its point of attachment with the transverse rod without changing the shape of the loop materially.

These and other objects and novel features of the present invention will be more clearly and fully set forth in the following specification and claims.

In the drawings forming a part of the specification:

Figure 1 is a perspective view of the dual accelerator, showing diagrammatically the manner in which it is attached to the accelerator pedal of an automobile.

Figure 2 is a plan view of the dual accelerator illustrated in Figure 1.

Figure 3 is a side elevational view of the dual accelerator shown in Figures 1 and 2.

Figure 4 is a sectional view on a vertical plane substantially parallel to the accelerator showing the manner in which an end of the device is attached to the vehicle accelerator.

One of the major advantages of the construction illustrated lies in its simplicity. Because of the fact that it may be produced from a single rod of steel or other material it may be produced at a low cost and may be sold at low cost. In spite of its simplicity, the structure is ingenious in that it is easily attachable and detachable to virtually any vehicle.

In Figure 1 of the drawing a portion of the floor of the front seat of a vehicle is diagrammatically illustrated, the floor usually including a substantially horizontal portion 10, and a forwardly and upwardly inclined floor portion 11. In cars having standard transmissions, a clutch pedal 12 is provided as well as a brake pedal 13. These pedals include lever arms 14 and 15 respectively which normally extend through slots 17 and 19 in the inclined portion 11 of the floor.

The accelerator pedal 20 is hingedly secured at 21 to the floor, the point of attachment usually being near the juncture of the horizontal portion 10 and the inclined portion 11. The accelerator pedal 20 is provided with a free end which overlies a rod or arm 22 connected in some way to the carburetor of the vehicle to control the flow of fuel therethrough.

The dual accelerator is indicated in general by the letter A and includes a central transverse portion 23 which is designed to extend transversely of the floor and substantially parallel to the axis of the hinge 21. As indicated in Figure 1 of the drawings an end portion 24 of the transverse portion 23 is designed to extend beneath the accelerator pedal 20 near the hinge 21. At this point the transverse portion 23 is bent at substantially right angles as shown at 25 to include an angularly extending portion 26 which is designed to extend substantially parallel to and adjacent one side of the accelerator pedal. At a point substantially spaced from the hinged end of the pedal 20, a transversely extending arm 27 is provided which is generally parallel to the intermediate portion 23 of the structure and which is designed to overlie the upper surface of the pedal 20. This transverse portion 27 is preferably provided with a downturned hook end 29 which extends downwardly on the side of the pedal 20 opposite the side along which the angularly extending portion 26 extends.

The opposite end of the transversely extending portion 23 of the structure is bent at somewhat less than a right angle with respect to the center portion, the point of bend being indicated by the numeral 30 and the angularly extending portion being indicated at 31. This portion 31 merges into a loop portion having generally parallel sides 32 and 33 connected by an integral connecting loop 34. The side 33 of the loop is connected to an inclined portion 35 which terminates close to the point of bend 30.

As will be indicated in Figure 3 of the drawings, all of the structure is preferably in substantially a common plane with the exception of the hook end 29 which extends at substantially right angles to the common plane.

The apparatus may be simply attached by extending the cross member 27 and its hook end beneath the accelerator and then turning the structure to extend the angularly inclined portion 26 beneath the accelerator. The portion which has been passed beneath the accelerator is moved until the part 27 and the hook end 29 clears the accelerator. This end of the structure may then be lifted and the entire structure moved in the opposite direction until the part 27 overlies the accelerator and the end 29 hooks over the side thereof.

In the event it is desirable to change the position or the angle of the auxiliary operating pedal, this can be done by bending the rod at the point of bend 30. As the rod is made of relatively heavy material, it will not bend easily but it can be bent if it is firmly held and if sufficient pressure is employed. Obviously, the rod will not bend under ordinary operating conditions.

It will be seen that the auxiliary pedal may be used to permit the operation of the vehicle by pressure of the left foot rather than the right foot as is conventional. As a result, during long periods of traveling, it is possible to rest one foot while the other is being used. Considerable less effort is accordingly used to drive the car.

In accordance with the patent statutes I have described the principles of construction and operation of my dual accelerator pedal and while I have endeavored to have the best embodiment thereof set forth, I desire to have it understood that obvious changes may be made within the scope of the following claims without departing from the spirit of my invention.

I claim:

1. A dual accelerator pedal for use in combination with a vehicle accelerator pedal, the dual accelerator pedal including a pivot rod designed to extend loosely across a portion of the floor boards of an automobile and beneath the vehicle accelerator pedal, an angularly bent arm on one end of said transverse portion adapted to extend along one side of the accelerator pedal, an angularly bent retaining portion extending from said arm generally parallel to said transverse portion and designed to overlie the accelerator pedal, and an auxiliary pedal loop secured to the other end of said transverse portion.

2. In combination with a vehicle accelerator pedal hingedly connected at one end to the floor boards of a vehicle, an auxiliary pedal including a single pivot rod having a portion thereof designed to extend transversely of the floor boards of the vehicle and beneath the vehicle accelerator pedal adjoining the hinged end thereof, an integral arm on one end of said transverse portion extending alongside of the vehicle accelerator pedal, a transversely extending retaining portion on the end of said arm extending generally parallel to said first transverse portion and designed to overlie the vehicle accelerator pedal, and an auxiliary pedal loop at the other end of said first transverse portion.

3. The construction described in claim 2 and in which said auxiliary pedal loop and said arm are arranged in a substantially common plane through said pivot rod.

4. The construction described in claim 2 and including a hook portion on said retaining portion designed to extend along the side of the vehicle accelerator pedal opposite that along which said arm extends.

5. In combination with a vehicle having an accelerator pedal hingedly connected near one end thereof to the vehicle floor boards, an auxiliary accelerator pedal unit constituting a single pivot rod having a first portion extending transversely along the floor boards and beneath said vehicle accelerator pedal adjoining the hinged end thereof, an angularly bent arm portion at one end of said first portion extending along one side of said vehicle accelerator pedal, a retaining portion attached to said arm and extending over said vehicle accelerator pedal, and an auxiliary accelerator pedal portion rigidly attached to the end of said first portion opposite that to which said arm is attached.

References Cited in the file of this patent

UNITED STATES PATENTS

| | | |
|---|---|---|
| 1,085,915 | Huseby | Feb. 3, 1914 |
| 1,385,496 | Rosenbrook | July 26, 1921 |
| 1,487,090 | Collins | Mar. 18, 1924 |
| 2,088,182 | Verch | July 27, 1937 |
| 2,187,068 | Adamic | June 16, 1940 |
| 2,226,569 | Martin | Dec. 31, 1940 |
| 2,645,948 | Beckman | July 21, 1953 |
| 2,735,312 | Howard | Feb. 21, 1956 |
| 2,829,539 | Wilcox | Apr. 8, 1958 |